US009559859B2

(12) United States Patent
Kacin et al.

(10) Patent No.: US 9,559,859 B2
(45) Date of Patent: Jan. 31, 2017

(54) HOME HUB

(75) Inventors: Martin Kacin, Palo Alto, CA (US); Michael R. Gray, Dublin, OH (US); Matthew N. Lewinski, Minneapolis, MN (US); Graham D. Perks, Round Rocks, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 1082 days.

(21) Appl. No.: 13/343,924

(22) Filed: Jan. 5, 2012

(65) Prior Publication Data
US 2013/0179500 A1  Jul. 11, 2013

(51) Int. Cl.
G06F 15/16 (2006.01)
H04L 12/28 (2006.01)

(52) U.S. Cl.
CPC ....... H04L 12/2809 (2013.01); H04L 12/2812 (2013.01); H04L 2012/285 (2013.01)

(58) Field of Classification Search
CPC ............. H04L 12/2809; H04L 12/2812; H04L 2012/285
USPC ........................................................ 709/204
See application file for complete search history.

(56) References Cited

U.S. PATENT DOCUMENTS

| 7,574,453 | B2 | 8/2009 | Julia |
| 7,627,138 | B2 | 12/2009 | Julia |
| 7,937,484 | B2 | 5/2011 | Julia |
| 8,990,367 | B2* | 3/2015 | Michael ............ G06F 17/30315 709/208 |
| 2003/0093791 | A1 | 5/2003 | Julia |
| 2006/0026271 | A1 | 2/2006 | Julia |
| 2006/0047843 | A1 | 3/2006 | Julia |
| 2006/0195441 | A1 | 8/2006 | Julia |
| 2006/0277318 | A1 | 12/2006 | Julia |
| 2007/0038771 | A1 | 2/2007 | Julia |
| 2007/0078948 | A1 | 4/2007 | Julia |
| 2007/0207755 | A1 | 9/2007 | Julia |
| 2008/0127289 | A1 | 5/2008 | Julia |
| 2009/0158402 | A1* | 6/2009 | Ding ....................... H04L 63/10 726/4 |
| 2010/0115060 | A1 | 5/2010 | Julia |
| 2011/0125925 | A1* | 5/2011 | Bouthemy .......... H04L 12/2834 709/250 |
| 2012/0113864 | A1* | 5/2012 | Bosneag ........... H04L 29/12028 370/254 |
| 2012/0136936 | A1* | 5/2012 | Quintuna ..................... 709/204 |

* cited by examiner

Primary Examiner — Joseph Greene
(74) Attorney, Agent, or Firm — Baker Botts L.L.P.

(57) ABSTRACT

In one embodiment, transmitting, from a first computing device, a private-home-network-discovery message that comprises a first identifier corresponding to a private-home-networking system, receiving, at the first computing device, one or more content-response messages from a second computing device that collectively comprise a second identifier corresponding to the second computing device, a third identifier corresponding to the private-home-networking system, and information corresponding to content stored on the second computing device, and storing, at the first computing device, the second and third identifiers and the information received in the one or more content response messages for access by one or more applications hosted on the first computing device, one of the applications being associated with administering the private-home-networking system.

20 Claims, 7 Drawing Sheets

HOME HUB

TECHNICAL FIELD

This disclosure generally relates to data management and more specifically relates to data management across various devices connected through a network.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a computer network connection. In particular, certain information handling systems may be designed to monitor, configure, and adjust the features, functionality, and software of other information handling systems by communicating with those information handling systems over a network connection. For example, one information handling system might be configured to manage the installation and updating of software on several other information handling systems.

In the context of the present disclosure, the term "network appliance" may refer to any device, such as an information handling system, which may include a combination of hardware, firmware, and/or software, that is capable of performing a set of operations or functions in connection with or over a computer network. The actual set of operations or functions a specific network appliance is capable of performing often depends on the hardware, firmware, and/or software included in that appliance. In the very least, however, a network appliance should be capable of being connected to a computer network.

Today, many consumer households are using multiple systems to purchase, store, and share their digital media. It is not uncommon to find multiple music players and music stores in use by different family members of the same household. For example, one family member may use iTunes® to purchase and listen to music while another family member may use Amazon.com®. The same may be said for all types of content, such as games, pictures, eBooks, movies, and television shows. Not only is it difficult for users to keep track of their digital media across the many devices that they use, it is also not easy for a user to view, play, or share their digital media across these devices.

There are continuous efforts to improve the quality of the content management across various computing devices connected over a network. Developers strive to improve content management by reducing processing time and increasing network efficiency.

DESCRIPTION OF EXAMPLE EMBODIMENTS

Figure 1:
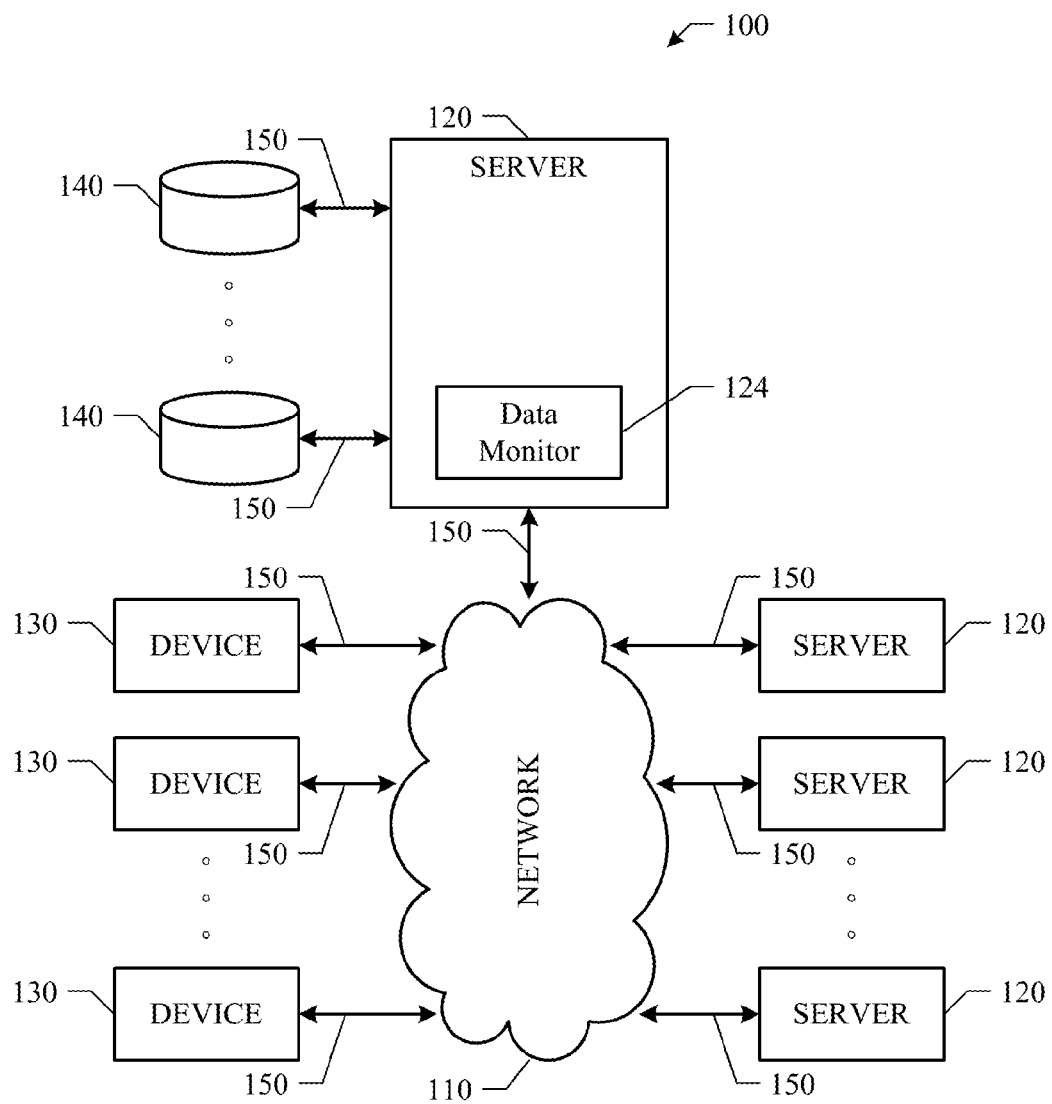
FIG. 1 illustrates an example network environment.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

The present disclosure generally relates to data management and more specifically relates to data management across various devices connected through a network.

Today, many consumer households are using multiple systems to purchase, store, and share their digital media. It is not uncommon to find multiple music players and music stores in use by different family members of the same household. For example, one family member may use iTunes® to purchase and listen to music while another family member may use Amazon.com®. The same may be said for all types of content, such as documents, games, music, pictures, eBooks, movies, and television shows. Not only is it difficult for users to keep track of their digital media across the many devices that they use, it is also not easy for a user to view, play, or share their digital media across these devices.

There are continuous efforts to improve the quality of the content management across various computing devices connected over a network. Developers strive to improve content management by reducing processing time and increasing network efficiency.

A private-home-networking system, in general, is a structure made up of computing devices that include functionality for communicating through a computer network either directly or remotely. Particular embodiments comprise a personal operating system on a functional private-home-networking system. As opposed to operating systems that are device centric, the personal operating system focuses on users and providing users seamless access to their content regardless of the operating system for a particular device or within the particular device itself. The personal operating system may inventory content, organize content, provide access to content across various computing devices connected over a network, and search a user's content, such as digital media (e.g. music, movies, pictures, etc.) across multiple computing devices, storage types (e.g., local storage devices and cloud storage devices), and social networks. The content may have been created by the user, such as with home movies, or purchased through an online music or video store, such as through iTunes®.

Particular embodiments comprise a dashboard-type viewer that displays content, allowing a user to both view, access, and change the content independent of the content's physical location, file type, or underlying platform. Particular embodiments may, in addition to gathering information about the content (e.g. file meta data, file location, etc.), allow a user to move and augment the content as well. Users may be able to access their content on Windows, iOS, Mac OS X, and Android devices, as well as devices utilizing other operating systems.

When a user registers an account for the home network, the private-home-networking system may create a global home network profile that will eventually encompass all of the computing devices in the home network and users that have permission to access the home network. Thereafter, a registered user may login to the private-home-networking system via an account by providing, for example, a correct login ID or username and password. As used herein, a "user" may be an individual (human user), an entity (e.g., an enterprise, business, or third party application), or a group (e.g., of individuals or entities) that interacts or communications with or over such a home network environment.

For each user, the private-home-networking system may create and store a record, such as a user profile, in connection with the user. The user profile may capture information from one or more users, such as name, email address, and demographic information. The user profile may be associated with a global account that will eventually encompass all computing devices. The user profile may also be associated with a unique identifier. For each computing device, the private-home-networking system may assign a unique identifier for each computing device as well. Once a user profile has been created, the user may download the necessary software to each of the devices that will be included in the private-home-networking system.

The private-home-networking system may allow "other" users without user profiles for the private-home-networking system hosting the content to access the content through an application, web-based application, web page, and the like in a manner described below with respect to dashboard-like controls or otherwise. The private-home-networking system may control access to specific content or devices through a privacy policy, described below. Types of "other" users may include, but are not limited to, other users of another private-home-networking system, other users who may be allowed access the content of the private-home-networking system through shared content within an email, shared content generally available through a web page, or by the other user logging into a web page.

Particular embodiments may be implemented in a network environment. FIG. 1 illustrates an example network environment 100. Network environment 100 includes a network 110 coupling one or more servers 120 and one or more devices 130 to each other. In particular embodiments, network 110 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 110 or a combination of two or more such networks 110. This disclosure contemplates any suitable network 110.

One or more links 150 couple servers 120 or devices 130 to network 110. In particular embodiments, one or more links 150 each includes one or more wired, wireless, or optical links 150. In particular embodiments, one or more links 150 each includes an intranet, an extranet, a VPN, a LAN, a WLAN, a WAN, a MAN, a communications network, a satellite network, a portion of the Internet, or another link 150 or a combination of two or more such links 150. This disclosure contemplates any suitable links 150 coupling servers 120 and devices 130 to network 110.

In particular embodiments, each server 120 may be a unitary server or may be a distributed server spanning multiple computers or multiple datacenters. Servers 120 may be of various types, such as, for example and without limitation, web server, news server, mail server, message server, advertising server, file server, application server, exchange server, database server, or proxy server. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to device 130 in response to HTTP or other requests from device 130. A mail server is generally capable of providing electronic mail services to various devices 130. A database server is generally capable of providing an interface for managing data stored in one or more data stores.

In particular embodiments, each device 130 may be an electronic device including hardware, software, or embedded logic components or a combination of two or more such components and capable of carrying out the appropriate functionalities implemented or supported by devices 130. For example and without limitation, a device 130 may be a desktop computer system, a notebook computer system, a netbook computer system, a handheld electronic device, or a mobile telephone. A device 130 may enable a network user at device 130 to access network 110. A device 130 may have a web browser, such as Microsoft Internet Explorer or Mozilla Firefox, and may have one or more add-ons, plug-ins, or other extensions. A device 130 may enable its user to communicate with other users at other devices 130. This disclosure contemplates any suitable devices 130.

In particular embodiments, one or more data storages 140 may be communicatively linked to one or more servers 120 via one or more links 150. In particular embodiments, data storages 140 may be used to store various types of information. In particular embodiments, the information stored in data storages 140 may be organized according to specific data structures. Particular embodiments may provide interfaces that enable servers 120 or devices 130 to manage (e.g., retrieve, modify, add, or delete) the information stored in data storage 140.

In particular embodiments, a server 120 may also include a data monitor/collector 124. Data monitor/collection 124 may include hardware, software, or embedded logic components or a combination of two or more such components for carrying out the appropriate functionalities implemented or supported by data collector/collector 124 in association with the private-home-networking system. For example and without limitation, data monitor/collector 124 may monitor and collect network traffic data at server 120 and store the collected network traffic data in one or more data storage 140. The pairs of search query and usage of the private-home-networking system may then be extracted from the network traffic data.

In particular embodiments a privacy policy may specify a set of users, devices, or external systems that are allowed to access the private-home-networking system and devices within the private-home-networking system, and content stored on each of the devices. In particular embodiments, for example, a user of a private-home-networking system may authorize or allow users, devices, and external systems to access content within the private-home-networking system. In particular embodiments, for example, a user may block access to content in one or more or all devices within the private-home-networking system. In other embodiments, a user may grant access to certain content to users outside of the private-home-networking system; for example, a user might grant users of a second private-home-networking system access to specific content from a first private-home-networking system, a user might allow others access to content on the first private-home-networking system by logging into a website, or a user might make the content generally accessible on a website. Particular embodiments contemplate various combinations of granularity of permitted access or denial of access depending on the type of content, user information, and devices or external entities with which content may be shared or accessed, as specified by the user in the privacy policy. In particular embodiments, a device 130 or a server 120 may have an authorization system by which the privacy policy may be enforced for the users of the private-home-networking system. In particular embodiments the privacy settings of a user or an account determines how particular information associated with a user or an account may be shared.

Figure 2:
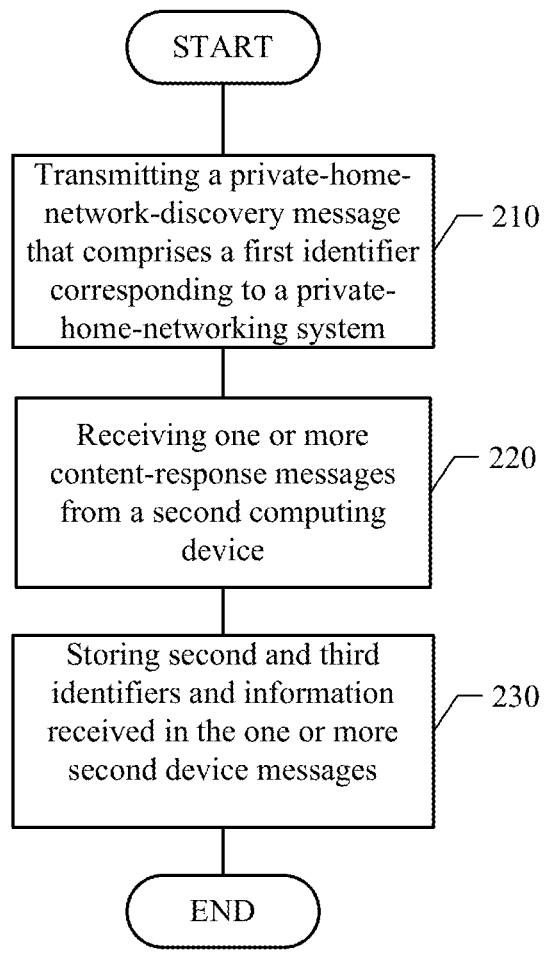
FIG. 2 illustrates an example method of creating a private-home-networking system.

FIG. 2 illustrates an example method for establishing a private-home-networking system using various network protocols. In particular embodiments, mobile networks may be used to connection various computing devices. Particular embodiments may create a home network among two or more computing devices having stored content by implementing a network protocol.

Computing devices may include so-called dual mode functionality including radio frequency (RF) and associated functionality allowing for wireless communication using different network protocols and networks. For example, some dual mode devices allow for packet-based, wireless communications over a cellular network using cellular network protocols, and over wireless local area networks using so-called WiFi or IEEE 802.11 standards. The IEEE 802.11 standard supports both an infrastructure mode where wireless communications are coordinated by an access point and an ad hoc mode where wireless communications are coordinated by a designated peer node. Much of the IEEE 802.11 standard defines a common operation whether using ad hoc or infrastructure mode. The use of ad hoc mode only affects the protocols, so there is generally no impact on the Physical Layers (i.e., 802.11a and 802.11b). Within the Media Access Control (MAC) Layer, all of the carrier sensing and most of the frame types and corresponding usage are the same regardless of which mode is utilized. There may or may not be an access point present, thus, in particular embodiments, an ad hoc wireless LAN must take on more of the MAC Layer responsibilities.

Within the semantics of the open systems interconnection (OSI) network architecture, the Data Link Layer protocols respond to service request from the network layer and they perform their function by issuing service requests to the PHY Layer. In some networks, such as IEEE 802 local area networks, the Data Link Layer is described in more detail with MAC and Logical Link Control (LLC) sublayers. In general, the MAC Layer manages and maintains communications between 802.11 stations (radio cards and access points) by coordinating access to a shared radio channel and utilizing protocols that enhance communications over a wireless medium. Often viewed as the "brains" of the network, the 802.11 MAC Layer uses an 802.11 PHY Layer, such as 802.11b or 802.11a, to perform the tasks of carrier sensing, transmission, and receiving of 802.11 frames.

A Media Access Control address (MAC address) is a unique identifier assigned to network interfaces for communications on the physical network segment. MAC addresses are used for numerous network technologies and most IEEE 802 network technologies, including Ethernet and WLAN. MAC addresses are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. MAC addresses are formed according to the rules of one of three numbering name spaces managed by the Institute of Electrical and Electronics Engineers (IEEE): MAC-48, Extended unique identifier (EUI)-48, and EUI-64.

With respect to infrastructure wireless LANs, primary 802.11 MAC functions consist of scanning, authentication, association, wireless encryption protocol (WEP), request-to-send and clear-to-send (RTS/CTS), power save mode, fragmentation, and the like. The 802.11 standard defines various frame types that stations (i.e., NICs and access points) use for communications, as well as managing and controlling the wireless link, such as management frames, control frames, and data frames. Every frame has a control field that depicts the 802.11 protocol version, frame type, and various indicators, such as whether WEP is on, power management is active, and so on. In addition, all frames contain MAC addresses of the source and destination station (and access point), a frame sequence number, frame body and frame check sequence (for error detection).

IEEE 802.11 frames carry protocols and data from higher layers within the frame body. A data frame, for example, could be carrying the HTML code from a web page (complete with TCP/IP headers) that the user is viewing or code associated with a social networking system. Other frames that mobile devices use for management and control carry specific information regarding the wireless link in the frame body. With respect to an infrastructure based network, for example, a beacon's frame body contains the service set identifier (SSID), timestamp, and other pertinent information regarding the access point.

IEEE 802.11 management frames enable stations, such as mobile devices, to establish and maintain communications. Common 802.11 management frame subtypes consist of authentication frames, deauthentication frames, association request frames, association response frames, reassociation request frames, reassociation response frames, disassociation frames, beacon frames, probe request frames, and probe response frames. 802.11 control frames assist in the delivery of data frames between stations. The following are common 802.11 control frame subtypes: Request to Send (RTS) frame, Clear to Send (CTS) frame, and Acknowledgement (ACK) frame. Further, 802.11 defines a data frame type that carries packets from higher layers, such as web pages, printer control data, and the like, within the body of the frame.

Network address translation (NAT) traversal is a general term for techniques that establish and maintain Internet protocol connections traversing NAT gateways. NAT breaks end-to-end connectivity. In particular embodiments, intercepting and modifying traffic may only be performed transparently in the absence of secure encryption and authentication. NAT traversal techniques are typically required for client-to-client networking applications, especially peer-to-peer and Voice over IP (VoIP) deployments. Particular embodiments employ various techniques for NAT traversal because no single method for NAT traversal works in every home networking situation. In particular embodiments, NAT traversal techniques require assistance from a server at a publicly-routable IP address. Particular embodiments, use a server only when establishing the connection, while others may be based on relaying all data through it, which adds bandwidth costs and increases latency, detrimental to real-time voice and video communications.

NAT devices may be installed to alleviate Internet Protocol version 4 (IPv4) address exhaustion by allowing the use of private IP addresses on home and corporate networks behind routers with a single public IP address facing the public Internet. The internal network devices communicate with hosts on the external network by changing the source address of outgoing requests to that of the NAT device and relaying replies back to the originating device. This leaves the internal network ill-suited to host servers, as the NAT device has no automatic method of determining the internal host or device for which incoming packets are destined. In particular embodiments, this may not be a problem for home users behind NAT devices doing general web access and e-mail. However, applications such as peer-to-peer file sharing, VoIP services and the online services of current generation video game consoles require clients to be servers as well, thereby posing a problem for users behind NAT devices, as incoming requests cannot be easily correlated to the proper internal device. Furthermore many of these types of services carry IP address and port number information in the application data, potentially requiring substitution or special traversal techniques for NAT traversal In particular embodiments, most NAT behavior-based techniques bypass enterprise security policies. Particular embodiments cooperate with NAT and firewalls, allowing NAT traversal while still enabling marshalling at the NAT to enforce enterprise security policies. Particular embodiments, in home or small office settings, most small NAT gateways support Universal Plug and Play (UPnP). NAT-T is commonly used by IPsec virtual private network clients in order to have Encapsulating Security Payload packets traverse NAT.

In particular embodiments, in order for IPsec to work through a NAT, the following protocols need to be allowed through the NAT interface, e.g., the LAN router: Internet Key Exchange (IKE)-User Datagram Protocol (UDP) port 500; Encapsulating Security Payload (ESP)-IP protocol number 50; Authentication Header (AH)-IP protocol number 51; or, in case of NAT-T: IKE-UDP port 500; and IPsec NAT-T-UDP port 4500. Often this is accomplished on home routers by enabling "IPsec Passthrough." In Windows XP, for example, NAT-T is enabled by default, but in XP with SP2, has been disabled by default for the case when the VPN server is also behind a NAT device. IPsec NAT-T patches are also available for Windows 2000, Windows NT and Windows 98. Particular embodiments of NAT-T and IPsec enable opportunistic encryption between systems. NAT-T, for example, may allow systems behind NATs to request and establish secure connections on demand.

Particular embodiments transmit, from a first computing device, one or more private-home-network-discovery messages, as illustrated in step 210. The private-home-network-discovery messages may be sent using any of the protocols described above and contain any of the security measures also previously described. The private-home-network-discovery message may comprise a first identifier corresponding to a private-home-networking system that may be recognized by any other computing device also associated with the private-home-networking system. The first identifier may be unique to a specific private-home-networking system and unrecognizable by any other computing device not associated with the private-home-networking system.

The first computing device may be any device 130, such as described above in FIG. 1. Additionally, in particular embodiments, the first computing device may be an existing computer in the home that hosts a main software module. Particular embodiments of the first computing device may have no "master" software module, but instead may have an iteration of a peer client software that each of the first and second client devices all host. In particular embodiments, more complex devices may host a more full-featured version of the software whereas devices, such as mobile devices, may host a less-featured version of the software. In particular embodiments, all devices may access software hosted on the internet as opposed to utilizing locally stored software. Additionally, the first computing device may be a stand-alone home appliance device that runs the main software module with client software running on the other devices that will be added to the private-home-networking system. In particular embodiments, the stand-alone home appliance device may be communicatively coupled to external servers, such as servers located in the cloud. Still further, a first computing device may be a server external to the private-home-networking system that hosts a master software module in the cloud.

Particular embodiments receive, at the first computing device, one or more content-response messages from one or more second computing devices, such as illustrated in step 220. In particular embodiments, all computing devices that are turned on, running the private-home-networking system software, and are communicatively coupled to a network, may also send out device discovery messages. Content-response messages may be received from any other computing device capable of receiving the initial private-home-network discovery message. Any other computing device may be running software compatible with the private-home-networking system or accessing content for the private-home-networking system on the web, such as a private-home-networking system website or third party website. In response to receiving a recognizable private-home-network discovery message comprising a first identifier corresponding to the private-home-networking system, the other computing system may send one or more content-response messages to the first computing device. The one or more content-response messages may comprise a second identifier that corresponds to the other computing device, a third identifier that corresponds to the private-home-networking system, or information corresponding to content stored on the other computing device. Each content-response message may have a second identifier, a third identifier, and information, or part of a second identifier, a third identifier, or information corresponding to the content of the other computing device.

Particular embodiments, store, at the first computing device, each of the second identifier, the third identifier, or information, each received in the one or more content-response messages, as illustrated in step 230. In order for applications to communicate, the devices hosting the applications must use a common application protocol (types of messages, formats and so on). These sets of conventions may be grouped in profiles. Furthermore, binding may be decided upon by matching input and output identifiers, unique within the context of a given device profile and associated to an incoming or outgoing data flow in a device. Binding tables contain source and destination pairs. The computing devices may employ any protocol, including table-driven routing protocols and on-demand routing protocols. Each computing device, in turn, learns about computing devices nearby having identifiers associated with the private-home-networking system, how to reach them, and how each other device can ultimately reach the first computing device or each of any other computing device in the private-home-networking system.

Depending on the available information, device discovery may follow different methods. When the network address is known, the IEEE address can be requested using unicast communication. When it is not, petitions are broadcast (the IEEE address being part of the response payload). End devices will simply respond with the requested address, while a network coordinator or a router will also send the addresses of all the devices associated with it. This extended discovery protocol permits external devices to find out about devices in a network and the services that they offer, which endpoints can report when queried by the discovering device (which has previously obtained their addresses). Matching services can also be used. In particular embodiments, the use of cluster identifiers enforces the binding of complementary entities by means of the binding tables, which are may be maintained by the private-home-networking system, as the table must be always available within a network and coordinators are most likely to have a permanent power supply. Backups, managed by higher-level layers, may be needed by some applications. Binding requires an established communication link; after it exists, whether to add a new node to the network is decided, according to the application and security policies.

In particular embodiments, communication may happen right after the association. Direct addressing uses both radio address and endpoint identifier, whereas indirect addressing uses every relevant field (address, endpoint, cluster and attribute) and requires that they be sent to the private-home-networking system, which maintains associations and translates requests for communication. Indirect addressing is particularly useful to keep some devices very simple and minimize their need for storage. In addition, particular embodiments may broadcast to all endpoints in a device may be available, and group addressing may used to communicate with groups of endpoints belonging to a set of devices.

Particular embodiments may determine the inventory and provide information on the most common types of files stored within the private-home-networking system. Particular embodiments may identify many types of file extensions, such as pictures ("bmp", "gif", "jpg", "jpeg", "png", "psd", "tif", "tiff", raw camera files, "arw", "crw", "cr2", "dng", "nef", "nrw", "orf", "ptx", "raw", "srw"), movies ("3gp", "3g2", "avi", "flv", "m4v", "mkv", "mp4", "mpg", "mpe", "mpeg", "mov", "wmv"), and music ("aa", "aac", "aiff", "au", "flac", "m4a", "m4b", "m4p", "mp2", "mp3", "ogv", "oga", "ogg", "vox", "way", "wma").

Particular embodiments may gather the following meta data from media files: name, artist, album, track number, year, genre, create time, modify time, size, iTunes® track ID, whether the media file is protected, the kind of media that the file represents, such as whether the media is music, a movie, or TV Show, and the full path and extension. In particular embodiments, if the file has an ID3 tag in the file, name, artist, album, track number, year, and genre may also be gathered. In particular embodiments where content are generic photos found in folders of a device, file name, file date, and size may be gathered. Photos may also contain exchangeable image file format data, in which the camera type, global positioning system (GPS) location data, date taken, and exposure details may also be gathered.

In particular embodiments, any content that has been found may be stored in a SQLite database. In particular embodiments, queries are available that each emit an XML document. Examples of top-level inquiries include, but are not limited to artist, album, genre, and tracks, which may be optionally filtered by adding a source, album, artist, or genre. Appendix A illustrates example queries and possible locations of where content may be stored throughout various operating systems.

Figure 3:
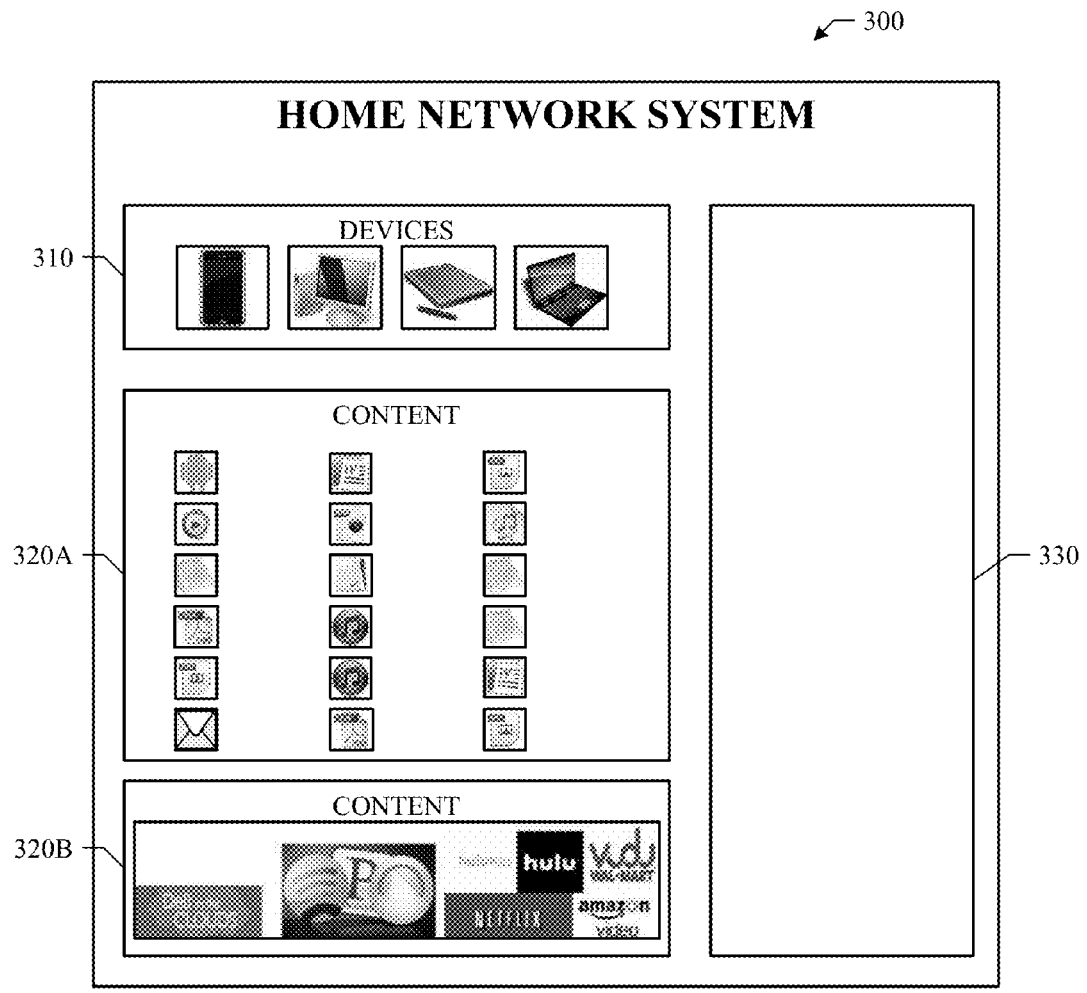
FIG. 3 illustrates an example user interface of a private-home-networking system.

In particular embodiments, once the content has been queried and located, the results of the query may be presented in a first view, such as a list, of available content in the private-home-networking system. FIG. 3 illustrates an example user interface 300 of a private-home-networking system providing a visual presentation of content residing in the private-home-networking system or external content that may be accessible through the private-home-networking system. In particular embodiments, content 320A is displayed in a manner that appears as a uniform file system even though content 320A identified in the visual display may reside on any of the devices 310 that are on and connected to the private-home-networking system. Content 320A may also be content in any file format from any operating system. In particular embodiments, content 320B may be displayed in the same visual display or a separate visual display from content 320A. Content 320B may be content in any file format from any operating system and may reside in data stores of any type of servers either internal or external, such as servers 120 described in FIG. 1. Users may be able to access content 320B even if content 320B resides on external sites, such as iCloud®, Amazon.com®, Facebook®, Flickr®, Picasa® Web Albums, Photobucket®, Twitter®, GooglePlus®, and the like.

Example user interface 300 may also comprise dashboard-like controls, such as controls 330, where the user may manage content 320A, 320B, including but not limited to accessing, adding, deleting, or modifying such content. In particular embodiments, controls 330 may graphically represent actions being performed, such as the progress or the scanning, a progress bar, and results of the number of files (count) and size of files selected. In particular embodiments, controls 330 may graphically represent the count or size or both of the accessible content.

In particular embodiments, controls 330 may provide access to or an interface to a digital asset locker system that incorporates the concepts of cloud backup of the user's content, de-duplication of content located in various devices or servers, synchronization of content across all devices or servers, and transcoding of content in order across various devices or servers to enable a user to more efficiently manage and access all of his or her content.

Particular embodiments allow content within the private-home-networking system to be accessible by any approved users on any approved devices. Users may navigate through their content across multiple devices and multiple operating systems. In particular embodiments, for example, a user may want to organize and share their content, such as media files. If a user or a device is not approved, the private-home-networking system may notify that user or device that a request to access content on the private-home-networking system has been denied.

In particular embodiments, for example, a user has a lot of content distributed among various devices that may be connected through a network. The user may want to organize and share all of his or her content, such as media files. Particular embodiments of the private-home-networking system allows content to be shared among various devices.

Figure 4:
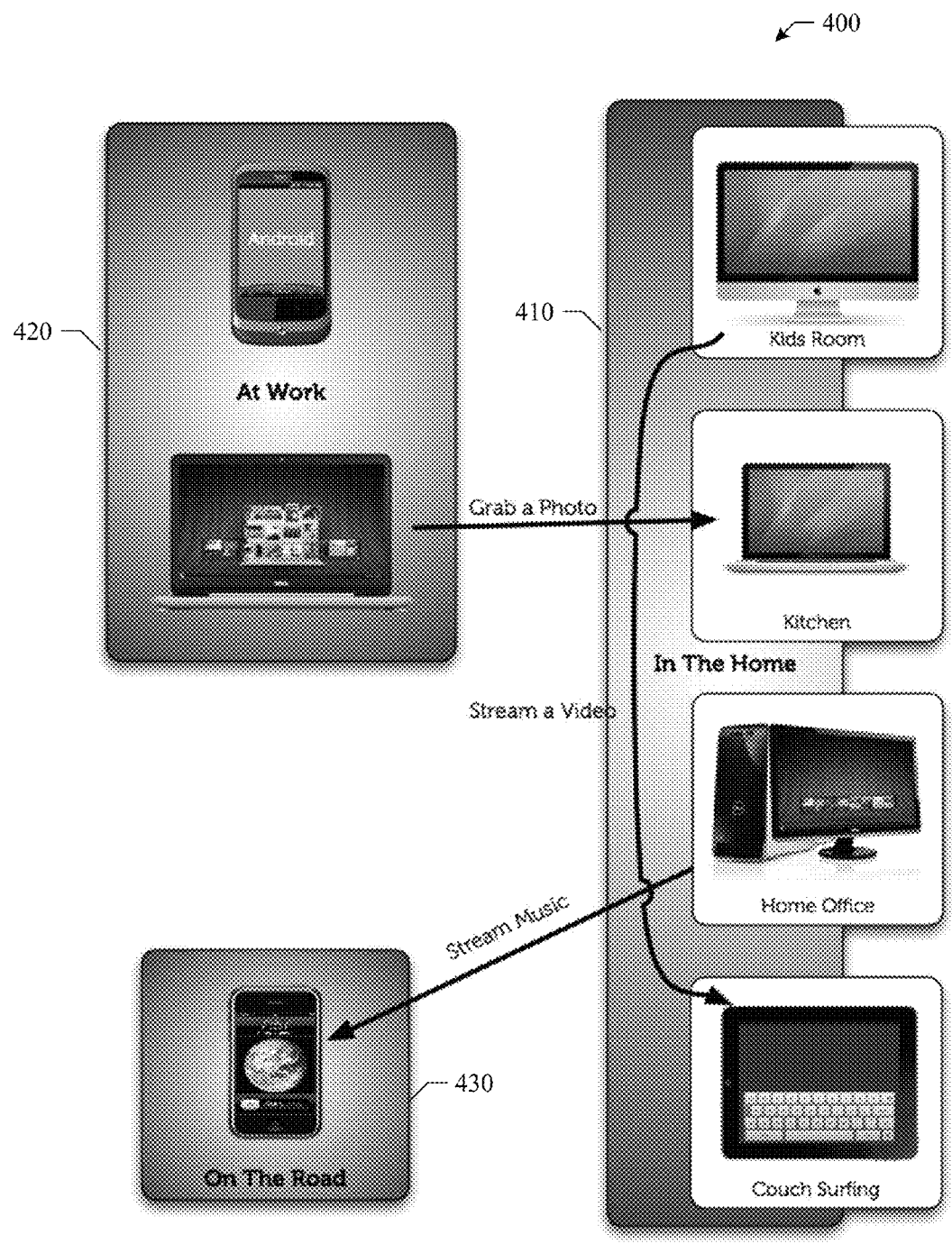
FIG. 4 illustrates an example private-home-networking system environment.

FIG. 4 illustrates an example environment where content may be shared among users and devices in a private-home-networking system whether the computing devices reside locally in the home 410, at work 420, or on the road 430. In particular embodiments, one or more computing devices may reside in the home 410 and run the private-home-networking system, integrating all of the devices in the home. In particular embodiments, devices residing at work 420 may also be running software associated with the private-home-networking system that allows the user to access one or more of the devices at home 410 in order to, for example, access a photo file stored on a computing device in the kitchen.

In particular embodiments, computing devices on the road 430 may also be running software associated with the private-home-networking system. In particular embodiments, for example, a user of a computing device at home 410 may request access to content on a computing device on the road 430. In particular embodiments, the computing device at home 410 may stream music from the computing device that is on the road 430.

In particular embodiments, should an unauthenticated computing device attempt to access content stored on any of the one or more computing devices associated with the private-home-networking system, it would be notified that it is not authorized to access the content and be denied access to the content.

Figure 5:
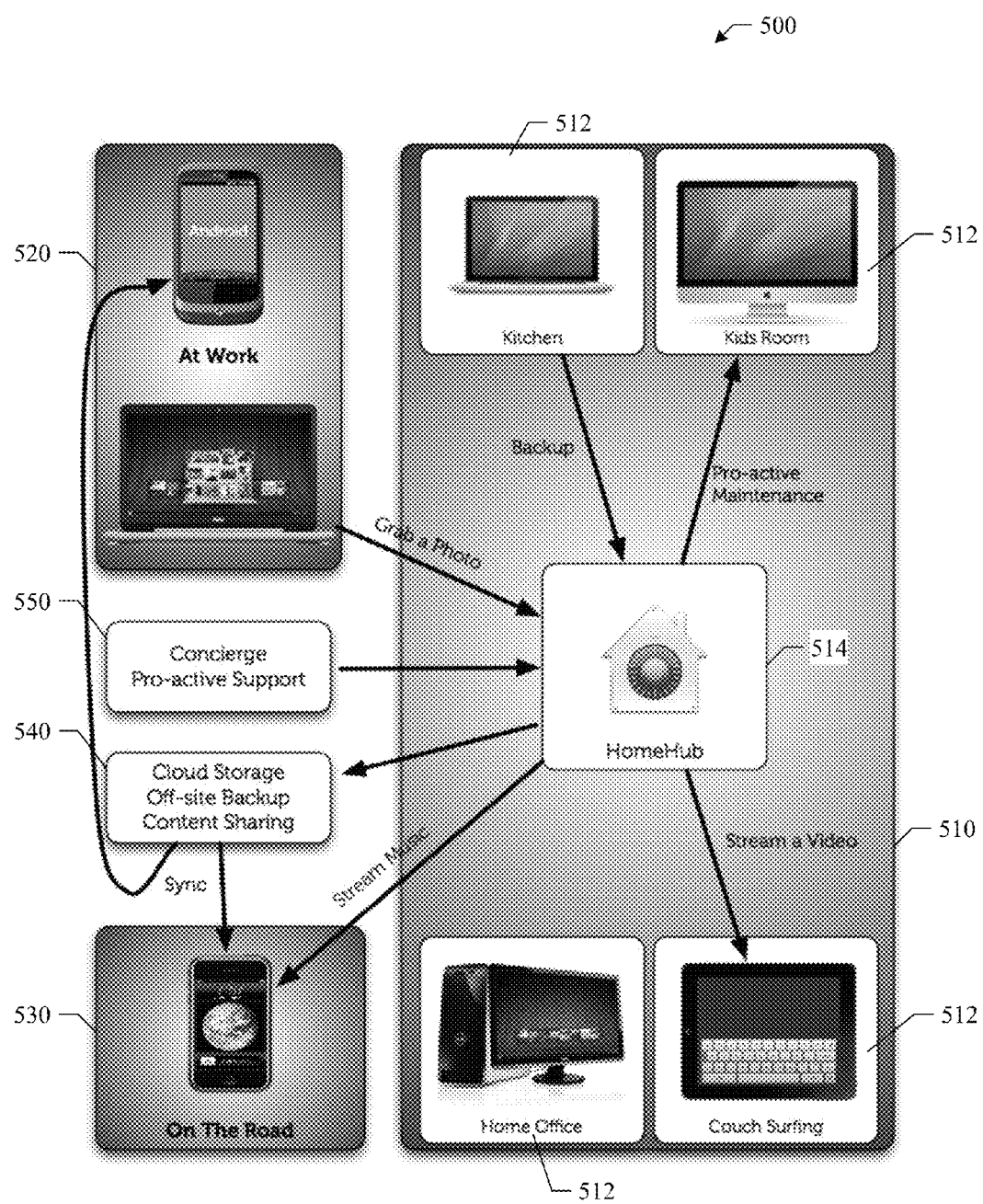
FIG. 5 illustrates a second example private-home-networking system environment.

FIG. 5 illustrates a second example environment where content may be shared among various users and devices of the private-home-networking system where the private-home-networking system may be centrally controlled by an appliance 514, such as a stand-alone home appliance, for example, a home hub. In particular embodiments appliance 514 may facilitate content access between computing devices 512 in the home 510, between computing device 512 and devices at work 520, and between computing devices 512 and devices on the road 530 as described with respect to FIG. 4. In particular embodiments, appliance 514 may facilitate interactions between the private-home-networking system and off-site storage 540, such as a digital asset locker system as described above. Still further, appliance 514 may facilitate third-party access 550 of the private-home-networking system to collect data, such as described above with respect to data monitor 124 in FIG. 1 or to provide real-time support of the private-home-networking system.

Particular embodiments allow for automatic cloud backup of content stored on various devices in the private-home-networking system. A set of user preferences associated with the user profile may allow the user to define specific backup parameters depending on the user's needs. In particular embodiments, for example, the user may set an interval for when backup occurs, such as every day or never, and the user may specify the content to be backed up, including media files, system configuration files, and installed applications or related installation files. In particular embodiments, automatic backup to off-site storage 540 may be managed by either appliance 514 or by a user executing software at another computing device whether or not the device is designated as a master.

Figure 6:
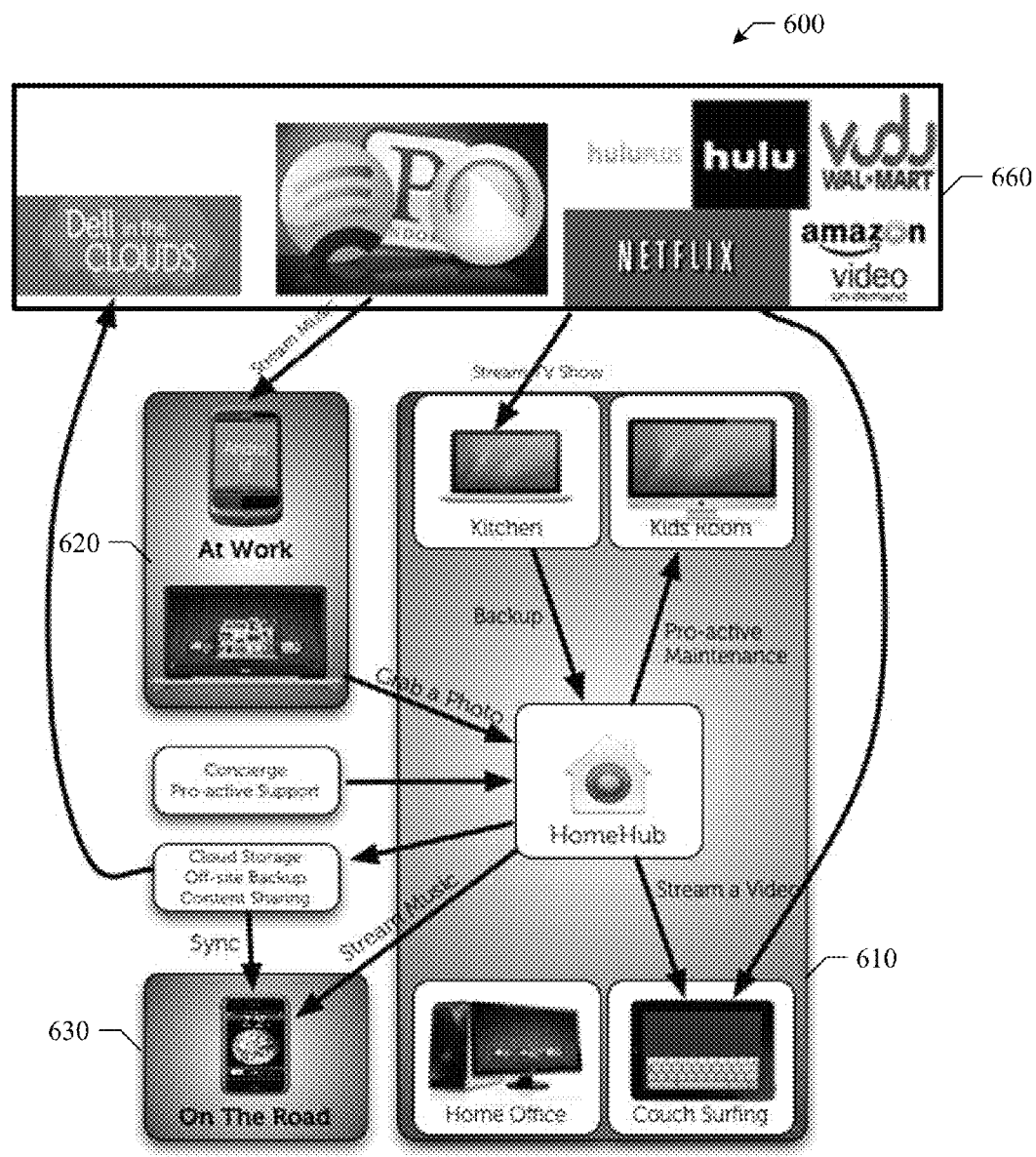
FIG. 6 illustrates a third example private-home-networking system environment.

FIG. 6 illustrates an example environment where various devices in the private-home-networking system may share, utilize, download, or access content in servers or other computing devices that are external to the private-home-networking system. As described above with respect to FIG. 3, content may be stored on external sites 660, such as such as iCloud®, Amazon.com®, Facebook®, Flickr®, Picasa® Web Albums, Photobucket®, Twitter®, GooglePlus®, and the like. In particular embodiments, devices connected to the private-home-networking system at home may access content located at a third party site. For example, a user of a computing device at home 610 may access content on external site 660, such as Netflix®, in order to stream a TV show. In particular embodiments, devices residing at work 620 may also be running software associated with the private-home-networking system that allows the user to access content stored on an external site 660, for example, to stream music from Pandora® to a computing device at work 620. Still in other particular embodiments, for example, a home hub may facilitate the streaming of music to a computing device at home 610 from a computing device on the road 630. Particular embodiments of the private-home-networking system allow users to purchase content through various content platforms and manage the purchases on the various computing devices in the home network. Particular embodiments allow for advertising to the user of the private-home-networking system and may optionally tailor the advertising to the user based on the information maintained by the private-home-networking system relating to that user. Particular embodiments upload and manage the content from the various devices to a cloud destination so there is a single location where users may access and manage all of their content as well as additional information and digital storage.

Figure 7:
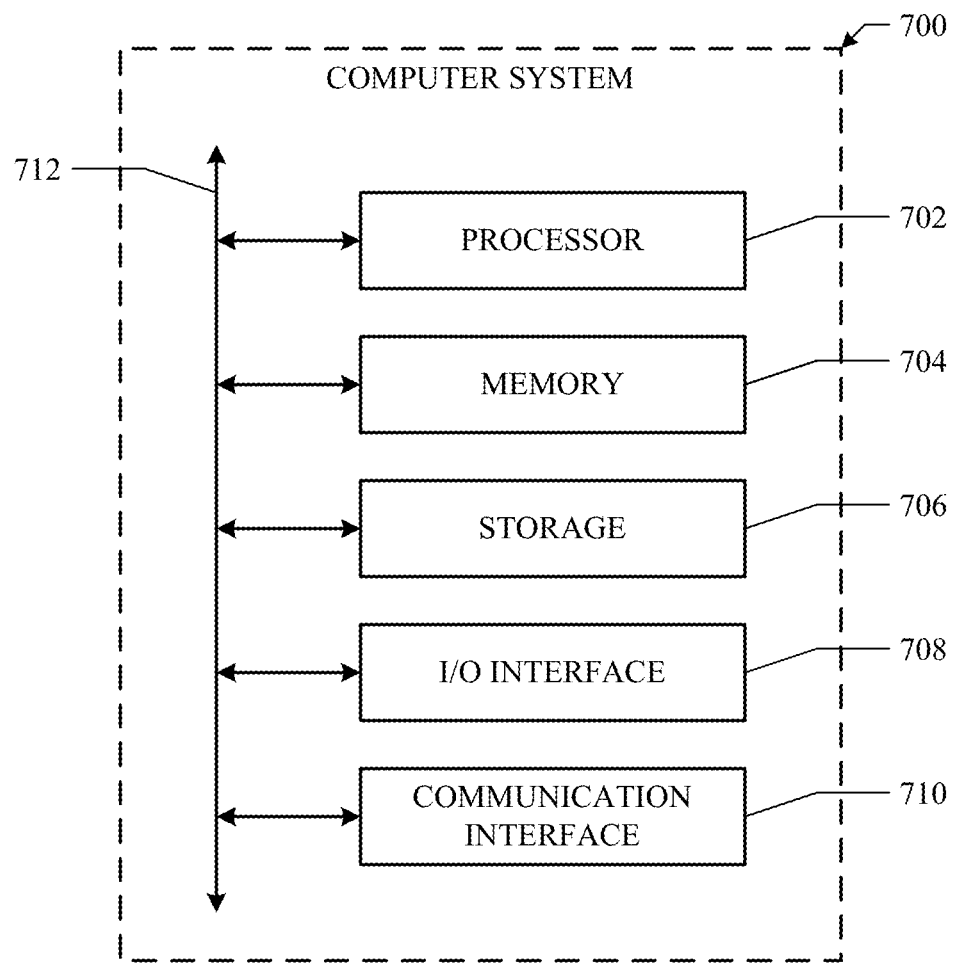
FIG. 7 illustrates an example computer system.

Particular embodiments may be implemented on one or more computer systems. FIG. 7 illustrates an example computer system 700 that may be used to implement a host, such as a server, client desktop computer or mobile device that executes the functionality described above. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such, as for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a suitable combination of these, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

APPENDIX A

Available Queries:
noomedia query -f "music/albums"—to find all albums
noomedia query -f "music/albums/sourceid=3/artist='Goldfrapp'"—to fetch all albums by artist 'Goldfrapp'
noomedia query -f "music/artists"—to find all artists
noomedia query -f "music/tracks"—to find all songs
noomedia query -f "music/tracks/sourceid=3/album='Seventh Tree'"—to fetch all track information for the album "Seventh Tree"
noomedia query -f "music/genres"—to find all genres
noomedia query -f "music/genres/sourceid=3"—to find all genres in a source
noomedia query -f "music/movies"—to find all movies
noomedia query -f "music/tvshows"—to find all TV Shows Example Code for Particular Queries:

---

Query "all albums" -> music/albums

---

```
<?xml version="1.0"?>
<media>
   <music>
      <source id="3">
         <album name="3 Rounds and a Sound" artist="Blind Pilot" />
         <album name="A Good Day" artist="Priscilla Ahn" />
         <album name="A Show Of Hands" artist="Rush" />
         <album name="Above & Beyond: Trance Around The World" artist="Above & Beyond: Trance Around The World" />
         . . .
      </source>
      <source id="5">
         . . .
   </music>
</media>
```

-continued

| Query "albums for an artist & source" –> music/albums/sourceid=3/artist='Goldfrapp' |
|---|

```xml
<?xml version="1.0"?>
<media>
  <music>
    <source id="3">
      <album name="Seventh Tree" artist="Goldfrapp" />
      <album name="Supernature" artist="Goldfrapp" />
    </source>
  </music>
</media>
```

| Query "albums for a genre" –> music/albums/genre='Pop' |
|---|

```xml
<?xml version="1.0"?>
<media>
  <music>
    <source id="3">
      <album name="A Good Day" artist="Priscilla Ahn" />
      <album name="Love Song - EP" artist="Sara Bareilles" />
      <album name="Once Upon A Time In The West" artist="Hard-Fi" />
      <album name="One Cell In The Sea" artist="A Fine Frenzy" />
      <album name="The Show - Single" artist="Lenka" />
      <album name="Who's Got Trouble" artist="Shivaree" />
    </source>
    <source id="5">
      <album name="A Good Day" artist="Priscilla Ahn" />
      . . .
```

| Query "track info for an album & source" –> music/tracks/sourceid=3/album='Seventh Tree' |
|---|

```xml
<?xml version="1.0"?>
<media>
  <music>
    <source id="3">
      <artist name="Goldfrapp">
        <album name="Seventh Tree">
          <track id="32">
            <genre>Alternative Rock</genre>
            <kind>MPEG audio file</kind>
            <mtime>2008/06/06 03:22:26</mtime>
            <name>Clowns</name>
            <protected>n</protected>
            <size>6915222</size>
            <source>3</source>
            <track_number>1</track_number>
            <year>2008</year>
          </track>
          <track id="33">
            <genre>Alternative Rock</genre>
            <kind>MPEG audio file</kind>
            <mtime>2008/06/06 03:25:27</mtime>
            <name>Little Bird</name>
            <protected>n</protected>
            <size>8300128</size>
            <source>3</source>
            <track_number>2</track_number>
            <year>2008</year>
          </track>
          . . .
        </album>
      </artist>
    </source>
  </music>
</media>
```

| Query "track info for an artist within a genre" –> music/tracks/artist='Goldfrapp'/genre='Pop' |
|---|

```xml
<?xml version="1.0"?>
<media>
  <music>
    <source id="6">
      <artist name="Goldfrapp">
        <album name="Rocket (Richard X One Zero Remix)">
          <track id="6082">
            <genre>Pop</genre>
            <kind>MPEG audio file</kind>
            <name>Rocket (Richard X One Zero Remix)</name>
            <protected>n</protected>
```

-continued

```
            <size>13837886</size>
            <source>6</source>
            <track_number>1</track_number>
            <year>2010</year>
          </track>
        </album>
      </artist>
    </source>
  </music>
</media>
```

Query "list sources searched for media" -> sources

```
<?xml version="1.0"?>
<media>
  <sources>
    <source sourceId="1" kind="iphoto">
      <path>/Users/grahamperks/Pictures/iPhoto Library copy</path>
    </source>
    <source sourceId="2" kind="iphoto">
      <path>/Users/grahamperks/Pictures/iPhoto Library</path>
    </source>
    <source sourceId="3" kind="itunes">
      <path>/Users/grahamperks/Music/iTunes/iTunes Music Library.xml</path>
    </source>
    <source sourceId="4" kind="folder">
      <path>/Users/grahamperks/Pictures</path>
    </source>
    <source sourceId="5" kind="folder">
      <path>/Users/grahamperks/Music</path>
    </source>
  </sources>
</media>
```

Query "list genres" -> genres

```
<?xml version="1.0"?>
<media>
  <music>
    <genre>Alt Rock</genre>
    <genre>Alternative</genre>
    <genre>Alternative Rock</genre>
    <genre>C64</genre>
    <genre>Classical</genre>
    ...
  </music>
</media>
```

Where Applications Store their Content:
Windows
  Music:
    Windows Shell
      % USERPROFILE %\Music—Vista/7 (FOLDERID Music)
      % USERPROFILE %\My Documents\My Music—XP (FOLDERID Music)
      % APPDATA %\Microsoft\Windows\Libraries\Musiclibrary-ms-7 (FOLDERID_MusicLibrary)
      % USERPROFILE %\Music\Playlists—Vista/7 (FOLDERID_Playlists)
      % PUBLIC %\Music—Vista/7 (FOLDERID_PublicMusic)
      % ALLUSERSPROFILE %\Documents\My Music—XP (FOLDERID_PublicMusic)
      % ALLUSERSPROFILE %\Microsoft\Windows\Ringtones-7 (FOLDERID_PublicRingtones)
      % LOCALAPPDATA %\Microsoft\Windows\Ringtones-7 (FOLDERID_Ringtones)
  iTunes
    http://support.apple.com/kb/ht1364
    % USERPROFILE %\My Music\iTunes-7 (weird)
    % USERPROFILE %\Music\iTunes—Vista
    % USERPROFILE %\My Documents\My Music—XP
  Photos:
    Windows Shell
      % USERPROFILE %\Pictures\Slide Shows—Vista/7 (FOLDERID_PhotoAlbums)
      % APPDATA %\Microsoft\Windows\Libraries\Pictureslibrary-ms-7 (FOLDERID_PicturesLibrary)
      % LOCALAPPDATA %\Microsoft\Windows Photo Gallery\Original Images—Vista/7 (FOLDERID_OriginalImages)
      % USERPROFILE %\Pictures—Vista/7 (FOLDERID_Pictures)
      % USERPROFILE %\My Documents\My Pictures—XP (FOLDERID_Pictures)
      % PUBLIC %\Pictures—Vista/7 (FOLDERID_PublicPictures)
      % ALLUSERSPROFILE %\Documents\My Pictures—XP (FOLDERID_PublicPictures)

Picasa
    % LOCALAPPDATA %\Google\Picasa2Albums—Picasa 2 and 3
Videos:
  Windows Shell
    % PUBLIC %\Videos—Vista/7 (FOLDERID_PublicVideos)
    % ALLUSERSPROFILE %\Documents\My Videos—XP (FOLDERID_PublicVideos)
    % PUBLIC %\RecordedTV.library-ms-7 (FOLDERID_RecordedTVLibrary)
    % USERPROFILE %\Videos—Vista/7 (FOLDERID_Videos)
    % USERPROFILE %\My Documents\My Videos—XP (FOLDERID_Videos)
    % APPDATA %\Microsoft\Windows\Libraries\Videos.library-ms-7
      (FOLDERID_VideosLibrary)
  Notes:
    Known Folders: http://msdn.microsoft.com/en-us/library/dd378457(v=VS.85).aspx
Mac
  Spotlight:
    Can query for file type, metadata information
    http://developer.apple.com/library/mac/#documentation/Carbon/Conceptual/MetadataIntro/MetadataIntro.html
    http://developer.apple.com/library/mac/#documentation/Carbon/Conceptual/SpotlightQuery/SpotlightQuery.html
  Photos:
    iPhoto
      iPhoto library list found in
        ~/Library/Preferences/com.apple.iPhoto.plist
          There's an array of folders under RecentRootDirectories.
          RootDirectory contains the most recently used one
      Default is ~/Pictures/iPhoto Library
    Photo Booth
      ~/Pictures/Photo Booth
  Music:
    iTunes
      ~/Music/iTunes
      ~/Music/iTunes/iTunes Music Library.xml—Readable format of iTunes Library
    Amazon MP3 Downloader
      ~/Music/Amazon MP3—Files go here before import to iTunes, but are not automatically cleaned up

What is claimed is:

1. A method comprising:
storing a user profile, wherein the user profile captures information from one or more users, wherein the user profile is associated with a global account, and wherein the global account comprises all of the devices associated with a private-home-networking system and all users that have permission to access the private-home-networking system;
controlling the private-home-networking system via an appliance, wherein the appliance facilitates content access between one or more computing devices within the private-home-networking system, wherein at least one of the one or more computing devices is remote from the appliance, and wherein the appliance provides real-time support for the private-home-networking system;
downloading one or more applications to the one or more computing devices within a private-home-networking system;
establishing a communication link between a first computing device and a second computing device;
transmitting, from the first computing device, a private-home-network-discovery message that comprises a first identifier corresponding to the private-home-networking system, wherein the first identifier is recognizable by any other device associated with the private-home-networking system, and wherein the first identifier is unrecognizable by any other computing device not associated with the private-home-networking system, wherein the first computing device hosts a main software module;
receiving, at the first computing device, one or more content-response messages from the second computing device that collectively comprise a second identifier corresponding to the second computing device, a third identifier corresponding to the private-home-networking system, and information corresponding to content stored on the second computing device, wherein the first computing device and the second computing device are associated with the global account, wherein the second computing device hosts a client software module associated with the main software module;
establishing within the private-home-networking system one or more Internet protocol connections traversing network address translation gateways using network address translation traversal, wherein at least one of the Internet protocol connections is established between the first computing device and the second computing device;
storing, at the first computing device, the second and third identifiers and the information received in the one or more content response messages for access by one or more applications hosted on the first computing device, one of the applications being associated with administering the private-home-networking system;
binding the first computing device and the second computing device, wherein one or more cluster identifiers enforces the binding, and wherein one or more binding tables are used to enforce the binding; and
controlling access to the first computing device and the second computing device of the private-home-networking system, wherein access is controlled based, least in part, on one or more of a privacy policy and the user profile, and wherein the privacy policy specifies at least one or more of one or more users one or more devices, or one or more external systems that are allowed to access one or more of the private-home-networking system and one or more devices within the private-home-networking system.

2. The method of claim 1, wherein the first and second computing devices communicate over a local home network.

3. The method of claim 2, further comprising:
displaying a first view utilizing the information received in the content-response message, the first view comprising a list that includes content of the first computing device and the second computing device.

4. The method of claim 3, wherein content comprises at least one of a document, picture file, music file, and video file.

5. The method of claim 3, wherein the first and second computing devices are both authorized to access content displayed in the first view.

6. The method of claim 3, wherein the first and second computing devices are authorized to make changes to content displayed in the first view.

7. The method of claim 3, further comprising:
receiving, at the first computing device, one or more first content-request messages from a third computing device that collectively comprise a fourth identifier corresponding to the third computing device, a fifth identifier corresponding to the private-home-networking system, and information corresponding to content stored on the third computing device;
determining, by the first computing device, whether the third computing device is authorized to access content associated with the private-home-networking system; and
notifying, by the first computing device, the third computing device that the content-request is denied in response to the third computing device not being authorized to access content associated with the private-home-networking system.

8. A system comprising:
a memory comprising instructions executable by one or more processors; and
the one or more processors coupled to the memory and operable to execute the instructions the one or more processors being operable when executing the instructions to:
store a user profile, wherein the user profile captures information from one or more users, wherein the user profile is associated with a global account, and wherein the global account comprises all of the devices associated with a private-home-networking system and all users that have permission to access the private-home-networking system;
control a private-home-networking system via an appliance, wherein the appliance facilitates content access between one or more computing devices within the private-home-networking system, wherein at least one of the one or more computing devices is remote from the appliance, and wherein the appliance provides real-time support for the private-home-networking system;
download one or more applications to the one or more computing devices within a private-home-networking system;
establish a communication link between a first computing device and a second computing device;
transmit a private-home-network-discovery message that comprises a first identifier corresponding to the private-home-networking system, wherein the first identifier is recognizable by any other device associated with the private-home-networking system, and wherein the first identifier is unrecognizable by any other computing device not associated with the private-home-networking system;
host a main software module;
receive one or more content-response messages from a second computing device that collectively comprise a second identifier corresponding to the second computing device, a third identifier corresponding to the private-home-networking system, and information corresponding to content stored on the second computing device, wherein the first computing device and the second computing device are associated with the global account, wherein the second computing device hosts a client software module associated with the main software module;
establish within the private-home-networking system one or more Internet protocol connections traversing network address translation gateways using network address translation traversal, wherein at least one of the Internet protocol connections is established between the first computing device and the second computing device;
store the second and third identifiers and the information received in the one or more content response messages for access by one or more applications hosted on the first computing device, one of the applications being associated with administering the private-home-networking system;
bind the first computing device and the second computing device, wherein one or more cluster identifiers enforces the binding, and wherein one or more binding tables are used to enforce the binding; and
control access to the first computing device and the second computing device of the private-home-networking system, wherein access is controlled based, least in part, on one or more of a privacy policy and the user profile, and wherein the privacy policy specifies at least one or more of one or more users one or more devices, or one or more external systems that are allowed to access one or more of the private-home-networking system and one or more devices within the private-home-networking system.

9. The system of claim 8, wherein the one or more content-response messages are received over a local home network.

10. The system of claim 9, the one or more processors further operable to:
display a first view utilizing the information received in the content-response message, the first view comprising a list that includes content already stored on the one or more processors and content stored on the second computing device.

11. The system of claim 10, wherein content comprises at least one of a document, picture file, music file, and video file.

12. The system of claim 10, wherein the second computing device is authorized to access all content displayed in the first view.

13. The system of claim 10, wherein the second computing device is authorized to make changes to content displayed in the first view.

14. The system of claim 10, the one or more processors further operable to:
receive one or more first content-request messages from a third computing device that collectively comprise a fourth identifier corresponding to the third computing device, a fifth identifier corresponding to the private-home-networking system, and information corresponding to content stored on the third computing device;
determine whether the third computing device is authorized to access content associated with the private-home-networking system; and
notify the third computing device that the content-request is denied in response to the third computing device not being authorized to access content associated with the private-home-networking system.

15. One or more computer-readable non-transitory storage media embodying software operable when executed by a first computer system to:
store a user profile, wherein the user profile captures information from one or more users, wherein the user profile is associated with a global account, and wherein the global account comprises all of the devices associated with a private-home-networking system and all users that have permission to access the private-home-networking system;

control a private-home-networking system via an appliance, wherein the appliance facilitates content access between one or more computing devices within the private-home-networking system, wherein at least one of the one or more computing devices is remote from the appliance, and wherein the appliance provides real-time support for the private-home-networking system;

download one or more applications to the one or more computing devices within a private-home-networking system;

establish a communication link between a first computing device and a second computing device;

transmit a private-home-network-discovery message that comprises a first identifier corresponding to the private-home-networking system, wherein the first identifier is unrecognizable by any other computing device not associated with the private-home-networking system, wherein the first identifier is recognizable by any other device associated with the private-home-networking system;

host a main software module;

receive one or more content-response messages from a second computing device that collectively comprise a second identifier corresponding to the second computing device, a third identifier corresponding to the private-home-networking system, and information corresponding to content stored on the second computing device, wherein the first computing device and the second computing device are associated with the global account, wherein the second computing device hosts a client software module associated with the main software module;

establish within the private-home-networking system one or more Internet protocol connections traversing network address translation gateways using network address translation traversal, wherein at least one of the Internet protocol connections is established between the first computing device and the second computing device;

store the second and third identifiers and the information received in the one or more content response messages for access by one or more applications hosted on the first computing device, one of the applications being associated with administering the private-home-networking system;

bind the first computing device and the second computing device, wherein one or more cluster identifiers enforces the binding, and wherein one or more binding tables are used to enforce the binding; and control access to the first computing device and the second computing device of the private-home-networking system, wherein access is controlled based, least in part, on one or more of a privacy policy and the user profile, and wherein the privacy policy specifies at least one or more of one or more users one or more devices, or one or more external systems that are allowed to access one or more of the private-home-networking system and one or more devices within the private-home-networking system.

16. The media of claim 15, wherein the one or more content-response messages are received over a local home network.

17. The media of claim 16, further operable to:
display a first view utilizing the information received in the content-response message, the first view comprising a list that includes content already stored on the one or more processors and content stored on the second computing device.

18. The media of claim 17, wherein content comprises at least one of a document, picture file, music file, and video file.

19. The media of claim 17, wherein the second computing device is authorized to access all content displayed in the first view.

20. The media of claim 17, wherein the second computing device is authorized to make changes to content displayed in the first view.

* * * * *